(12) United States Patent
Uejima

(10) Patent No.: US 6,213,697 B1
(45) Date of Patent: Apr. 10, 2001

(54) SELF-CUTTING EXPANSION ANCHOR

(75) Inventor: Yasutsugu Uejima, Izumi (JP)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/513,556

(22) Filed: Feb. 25, 2000

(51) Int. Cl.$^7$ ............................. F16B 13/04; F16B 13/06
(52) U.S. Cl. ........................... 411/30; 411/54.1; 411/57.1
(58) Field of Search .................................. 411/30, 31, 54, 411/54.1, 55, 57.1

(56) References Cited

U.S. PATENT DOCUMENTS

| | | |
|---|---|---|
| 4,614,471 | 9/1986 | Mauritz . |
| 4,678,383 | 7/1987 | Bergner . |
| 4,702,654 * | 10/1987 | Frischmann et al. ............... 411/31 |
| 4,702,656 | 10/1987 | Kerrom . |
| 4,714,391 | 2/1998 | Bergner . |
| 4,929,134 | 5/1990 | Bergner . |
| 4,968,200 | 11/1990 | Mark . |
| 4,984,945 | 1/1991 | Bergner . |
| 5,152,649 | 10/1992 | Popp . |
| 5,288,190 | 2/1994 | Winkeljann et al. . |
| 5,807,049 * | 9/1998 | Beck et al. ............................ 411/31 |
| 5,816,760 | 10/1998 | Mattner et al. . |
| 5,911,550 | 6/1999 | Popp et al. . |
| 5,921,733 | 7/1999 | Kailbach et al. . |

FOREIGN PATENT DOCUMENTS

| | | |
|---|---|---|
| 3535262 | 4/1987 | (DE) . |
| 0889250 | 5/1998 | (EP) . |
| 0921326 | 9/1998 | (EP) . |
| 0926359 | 11/1998 | (EP) . |
| 0926360 | 11/1998 | (EP) . |
| 0908634 | 4/1999 | (EP) . |

* cited by examiner

*Primary Examiner*—Neill Wilson
(74) *Attorney, Agent, or Firm*—Lisa M. Soltis; Mark W. Crow; John P. O'Brien

(57) ABSTRACT

A self-cutting expansion anchor and system having a sleeve member with a plurality of expandable sections disposed about a shaft, the expandable sections having an end portion disposed toward a generally conical portion of the shaft, a heat hardened cutting portion protruding from at least some of the expandable sections of the sleeve member, the hardened cutting portions and the corresponding expandable sections are unitary members, and a threaded sleeve member having a driving end disposed about the threaded shaft toward a driving end of the sleeve.

21 Claims, 2 Drawing Sheets

SELF-CUTTING EXPANSION ANCHOR

BACKGROUND OF THE INVENTION

The invention relates generally to expansion anchors, and more particularly to self-cutting expansion anchors and systems.

Known self-cutting expansion anchors generally comprise a sleeve having expansion tabs that expand in a pre-drilled bore, for example in concrete, upon axial displacement about a conical head portion of a dowel or shaft. The expansion tabs include cutters that form an undercut in the pre-drilled bore as the sleeve rotates therein, as disclosed for example in U.S. Pat. Nos. 5,816,760, 5,911,550, and 5,921,733.

It is known to form the cutters of self-cutting expansion anchors with hardened alloy inserts embedded on corresponding portions of the expansion tabs thereof, as discussed in U.S. Pat. No. 5,921,733 and in German Patent No. DE 3,535,262.

An object of the present invention is to provide novel self-cutting expansion anchors and systems that overcome problems and improve upon the prior art.

Another object of the invention is to provide novel self-cutting expansion anchors and systems that are reliable and economical.

A further object of the invention is to provide novel self-cutting expansion anchors having expandable sections with hardened cutting portions formed unitarily therewith.

A further object of the invention is to provide novel self-cutting expansion anchors having at least one pair of cutting portions disposed on corresponding expandable sections located on substantially opposites sides of an anchoring shaft thereof.

A more particular object of the invention is to provide novel self-cutting expansion anchors comprising a sleeve member having a plurality of expandable sections disposed about a shaft having a generally conical portion, a heat hardened cutting portion protruding from at least some of the expandable sections of the sleeve member, the hardened cutting portions and the corresponding expandable sections are preferably unitary members.

Another more particular object of the invention is to provide novel self-cutting expansion anchors comprising a sleeve member having a plurality of expandable sections disposed about a shaft with a generally conical portion, and a cutting portion on exactly two of the plurality of expandable sections located on generally opposite sides of the shaft.

Yet another more particular object of the invention is to provide novel self-cutting expansion anchoring systems comprising an expansion sleeve member having a plurality of expandable sections disposed about a shaft, a hardened cutting portion protruding from at least some of the expandable sections of the expansion sleeve member on a portion thereof disposed toward a generally conical portion of the shaft, the hardened cutting portions and the corresponding expandable sections are unitary members, and a threaded driving sleeve member having a driving end disposed about the threaded shaft toward a driving end of the expansion sleeve member.

These and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators.

DETAILED DESCRIPTION OF THE INVENTION

Figure 1:
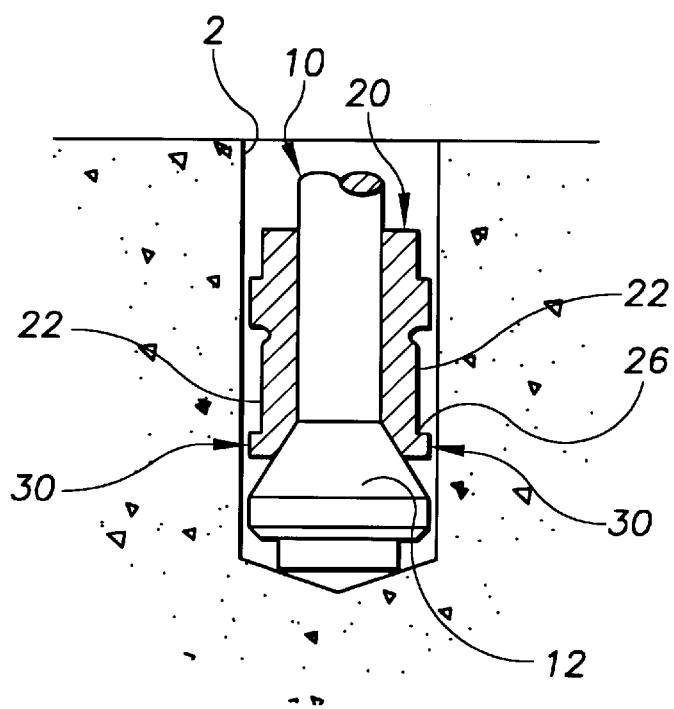
FIG. 1 is a partial sectional view of an exemplary self-cutting expansion anchor prior to setting thereof in a pre-drilled bore.

FIG. 1 illustrates a self-cutting expansion anchor comprising generally a shaft 10 having a generally conical portion 12 disposed along the axial dimension thereof, and an expansion sleeve member 20 having a plurality of expandable sections 22 disposed thereabout.

Figure 3:
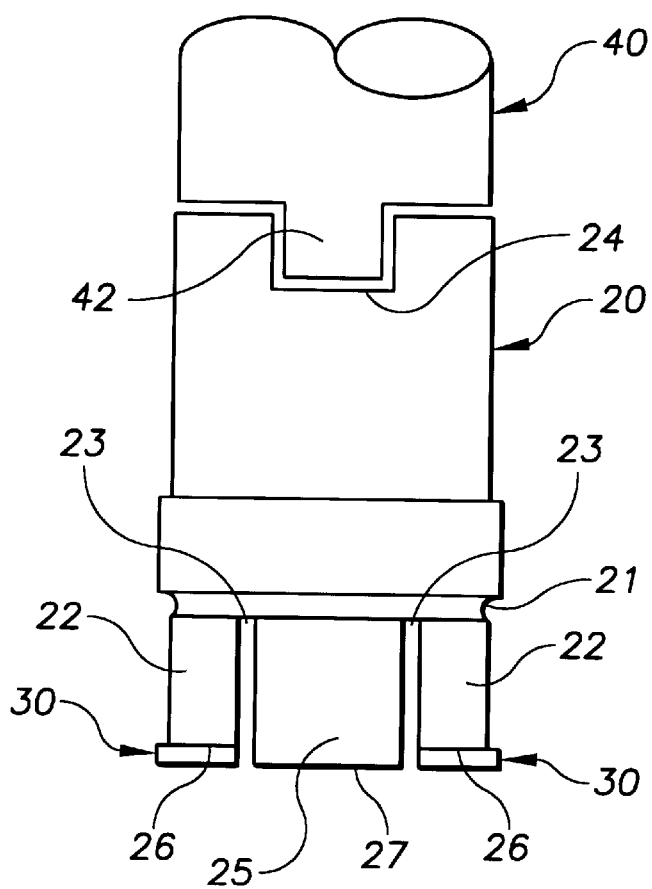
FIG. 3 is a side view of an exemplary expansion sleeve member having expandable sections with unitarily formed cutting portions, and a driving sleeve member.

In FIG. 3, the expandable sections 22 of the sleeve member 20 are separated by slots 23 therebetween formed in the sleeve member 20. In the exemplary embodiment, the sleeve 20 also comprises a deformable portion in the exemplary form of a groove 21 near the upper portion of the expandable sections to facilitate expansion thereof.

Figure 2:
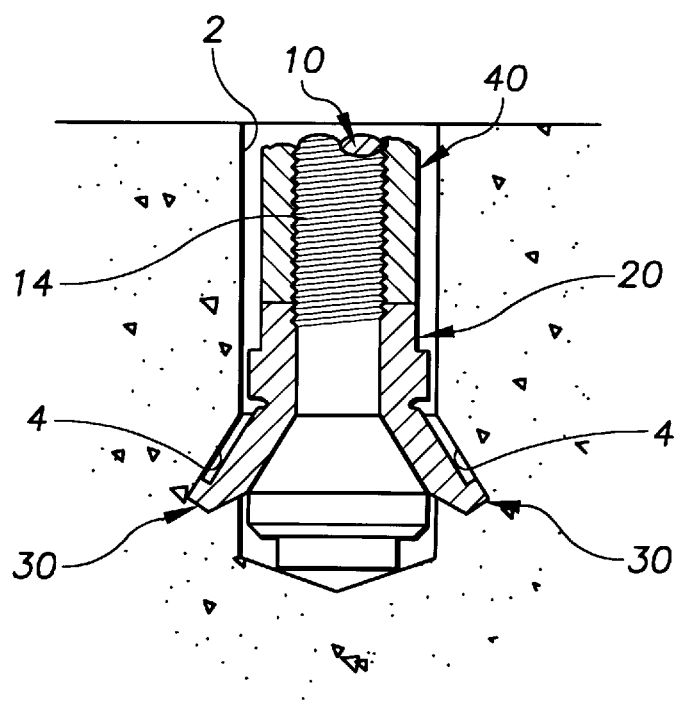
FIG. 2 is a partial sectional view of an exemplary self-cutting expansion anchor after setting thereof in a pre-drilled bore.

In FIGS. 1 and 2, the expandable sections 22 of the sleeve member 20 are aligned generally axially with or along the axial dimension of the shaft 10 and have an end portion disposed toward the generally conical portion 12 of the shaft. Thus configured, the expandable sections 22 expand generally outwardly upon axial displacement thereof along the generally conical portion 12 of the shaft, as discussed more fully below.

In FIG. 1, the self-cutting expansion anchor is disposed in a pre-drilled hole 2, formed for example in masonry or concrete or some other material. The expansion anchor also comprises one or more cutting portions 30 protruding from at least some of the expandable sections 22 of the expansion sleeve member 20. The cutting portions 30 form an undercut 4 in the bore upon rotation of the sleeve member therein, as discussed further below.

In the exemplary self-cutting expansion anchor system, a threaded drive sleeve member 40 is disposed about and engaged with a threaded portion 14 of the shaft, above the expansion sleeve member 20, thereby axially displacing the expansion sleeve member 20 along the shaft 10 upon rotation of the drive sleeve member 40 about the threaded shaft.

The drive sleeve member 40 generally comprises a driving end engagable with a complementary driving end of the expansion sleeve member 20 to impart rotation thereto. In the exemplary embodiment of FIG. 3, the drive sleeve member includes one or more teeth 42 cooperatively engageable with corresponding recesses 24 in the expansion sleeve member.

In other embodiments, the expansion sleeve member and more particularly the expandable sections and cutting portions thereof are rotated in the bore by alternative means.

In the exemplary system, rotation of the drive sleeve member 40 about the threaded shaft 10 imparts rotation to the expansion sleeve member 20 and axially advances the sleeve member 20 along the generally conical portion 12 of the shaft, thereby expanding the expandable sections 22 thereof. In FIG. 2, the undercut 4 is formed by the cutting portions 30 as the expanding sections 22 rotate and advance axially in the pre-drilled bore 2.

In one embodiment, the expandable sections 22 and the cutting portions 30 thereof are formed as unitary members. The cutting portions 30 are preferably hardened by heat treating, for example by nitriding, corresponding portions of the expandable sections 22.

In the exemplary embodiment, the sleeve and expandable sections and cutting portions thereof constitute a unitary member that is formed of an alloy steel comprising between approximately 0.40–0.50% wt. carbon and a relatively high aluminum content.

In one embodiment, the alloy steel is an Al—Cr—Mo alloy steel, for example an alloy steel known commercially as SACM645. An exemplary Al—Cr—Mo alloy steel suitable for the present application comprises between approximately 0.40–0.50% wt. C., between approximately 0.15–0.50% wt. Si, not more than approximately 0.60% wt. Mn, not more than approximately 0.03% wt. P, not more than approximately 0.03% wt. S, between approximately 1.30–1.70% wt. Cr., between approximately 0.15–0.30% wt. Mo. and between approximately 0.70–1.20% wt. Al. Other metal alloys may be used alternatively.

In one embodiment suitable for some concrete anchoring applications, the expandable sections 22, particularly the upper portions thereof where deformation occurs during expansion, have a hardness of approximately 250 Vickers and the cutting portions 30 thereof have a hardness of approximately 1000 Vickers or more.

These approximate hardness values however are only exemplary and may vary considerably depending on the particular configuration of the sleeve member and the particular requirements of the anchoring application, for example the properties of concrete aggregate.

Figure 4:
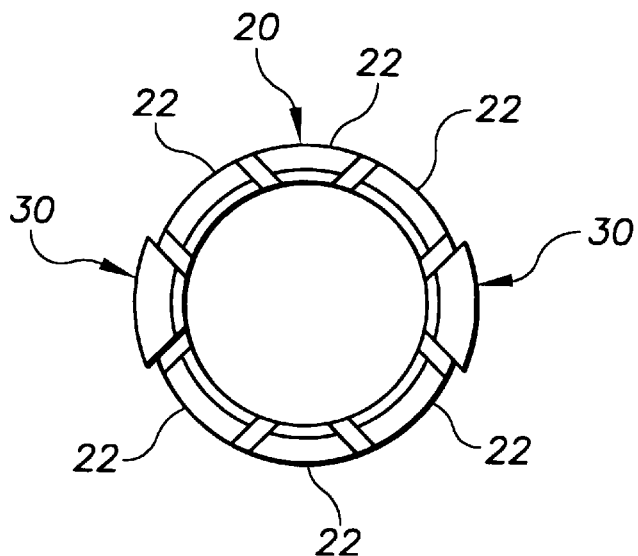
FIG. 4 is an end view of an exemplary sleeve expansion member.

In the exemplary embodiment of FIG. 3, the cutting portions 30 protrude generally radially from end portions 26 of the corresponding expandable sections 22 disposed toward the generally conical section of the shaft. In FIGS. 3 and 4, the cutting portions 30 extend about a circumferential portion of sleeve member.

In another embodiment, only some of the expandable sections have cutting portions thereon, and preferably the expandable sections adjacent the sections having cutting portions are devoid of cutting portions. In FIG. 3, for example, the expandable section 25, adjacent the sections 22 having corresponding cutting portions 30, is devoid of a cutting portion. The cutting portions 30 of sections 22 may extend axially beyond the end 27 of the expandable section 25, thus providing still more improved cutting action.

There is preferably at least one pair of cutting portions disposed on corresponding expandable sections located on substantially opposite sides of the expansion sleeve member. In the exemplary embodiment of FIG. 4, exactly two of the plurality of expandable sections 22 on substantially opposite sides of the sleeve member 20 have cutting portions 30 thereon. Thus configured the exactly two cutting portions are disposed on opposite sides of the shaft when the expanding sleeve member 20 is disposed thereabout.

The expansion sleeve member also preferably comprises at least one expandable section devoid of cutting portions disposed between the expandable sections having cutting portions. In FIG. 4, for example, there are several expandable sections 22 without cutting portions disposed between the expandable sections with cutting portions 30.

The expansion sleeve member 20 of FIG. 4 is also preferably formed unitarily, and the cutting portions 30 thereof are preferably hardened, for example by heat treating, at least relative to the portions thereof that are deformed during expansion of the expandable sections, as discussed above.

While the foregoing written description of the invention enables one of ordinary skill to make and use what is considered presently to be the best mode thereof, those of ordinary skill will understand and appreciate the existence of variations, combinations, and equivalents of the specific exemplary embodiments herein. The invention is therefore to be limited not by the exemplary embodiments herein, but by all embodiments within the scope and spirit of the appended claims.

What is claimed is:

1. A self-cutting expansion anchor comprising:

a shaft having a generally conical portion;

a sleeve member having a plurality of expandable sections disposed about the shaft and a hardened cutting portion protruding from at least some of the expandable sections of the sleeve member;

wherein the hardened cutting portions and the corresponding expandable sections are unitary members, at least two of the expandable sections on substantially opposite sides of the shaft have cutting portions, and at least one expandable section between the expandable sections having cutting portions is devoid of cutting portions.

2. The anchor of claim 1, wherein the hardened cutting portions are heat treated portions of the corresponding expandable sections.

3. The anchor of claim 1, wherein the sleeve member and expandable sections and cutting portions thereof are unitary and formed of a steel alloy comprising carbon and a relatively high percentage of aluminum.

4. The anchor of claim 1, wherein the expandable sections of the sleeve member are aligned generally axially along the shaft and have an end portion disposed toward the generally conical portion thereof, the cutting portions protruding generally radially from the end portion of the corresponding expandable sections.

5. The anchor of claim 4, wherein the cutting portions extend about a circumferential portion of the corresponding expandable sections.

6. The anchor of claim 1, the expandable sections having a hardness of approximately 250 Vickers and the cutting portions thereof having a hardness of at least approximately 1000 Vickers.

7. A self-cutting expansion anchor comprising:

a shaft having a generally conical portion;

a sleeve member having a plurality of expandable sections disposed about the shaft; and a cutting portion protruding from exactly two of the plurality of expandable sections located on generally opposite sides of the shaft;

wherein the cutting portions and the corresponding expandable sections are unitary members.

8. The anchor of claim 7, the sleeve member comprising at least one expandable section devoid of cutting portions disposed between the expandable sections having cutting portions.

9. The anchor of claim 8, the cutting portions extending about corresponding circumferential portions of the corresponding expandable sections on generally opposite sides of the shaft, the expandable sections having cutting portions extending axially beyond the expandable sections devoid of cutting portions.

10. The anchor of claim 7, wherein the expandable sections of the sleeve member are aligned generally axially with the shaft and have an end portion disposed toward the generally conical portion thereof, the cutting portions protruding generally radially from the end portion of the corresponding expandable sections.

11. The anchor of claim 10, wherein the cutting portions extend about a circumferential portion of the corresponding expandable sections.

12. The anchor of claim 7, wherein the cutting portions are hardened portions of the corresponding expandable sections.

13. The anchor of claim 12, wherein the sleeve member and expandable sections thereof are unitary members formed of a steel alloy comprising between approximately 0.40 and approximately 0.50% wt. carbon and approximately 0.70 and approximately 1.20% wt. aluminum.

14. The anchor of claim 12, the expandable sections having a hardness of approximately 250 Vickers and the cutting portions thereof having a hardness of at least approximately 1000 Vickers.

15. A self-cutting expansion anchor system comprising:

a threaded shaft having a generally conical portion;

an expansion sleeve member having a driving end and a plurality of expandable sections disposed about the shaft, the expandable sections having an end portion disposed toward the generally conical portion thereof, a hardened cutting portion protruding from at least some of the expandable sections of the expansion sleeve member, the hardened cutting portions and the corresponding expandable sections are unitary members;

a threaded driving sleeve member disposed about the threaded shaft, the driving sleeve member having a driving end disposed toward the driving end of the expansion sleeve member.

16. The system of claim 15, the hardened cutting portions are heat treated portions of the corresponding expandable sections.

17. The system of claim 15, exactly two of the expandable sections on substantially opposite sides of the shaft having cutting portions, the sleeve expansion member comprising at least one expandable section devoid of cutting portions disposed between the expandable sections having cutting portions.

18. The system of claim 15, the expandable sections and corresponding cutting portions thereof constitute a unitary member formed of a steel alloy comprising between approximately 0.40% and approximately 0.50% wt. carbon and between approximately 0.70 and approximately 1.20% wt. aluminum.

19. A self-cutting expansion anchor comprising:

a shaft having a generally conical portion;

a sleeve member having a plurality of expandable sections disposed about the shaft;

a hardened cutting portion protruding from at least some of the expandable sections of the sleeve member;

the hardened cutting portions and the corresponding expandable sections being unitary members;

wherein the expandable sections of the sleeve member are aligned generally axially along the shaft and have an end portion disposed toward the generally conical portion thereof, the cutting portions protruding generally radially from the end portion of the corresponding expandable sections and extending about a circumferential portion of the corresponding expandable sections.

20. A self-cutting expansion anchor comprising:

a shaft having a generally conical portion;

a sleeve member having a plurality of expandable sections disposed about the shaft; and a cutting portion protruding from exactly two of the plurality of expandable sections located on generally opposite sides of the shaft;

the sleeve member including at least one expandable section devoid of cutting portions disposed between the expandable sections having cutting portions;

the cutting portions extending about corresponding circumferential portions of the corresponding expandable sections on generally opposite sides of the shaft, the expandable sections having cutting portions extending axially beyond the expandable sections devoid of cutting portions.

21. A self-cutting expansion anchor comprising:

a shaft having a generally conical portion;

a sleeve member having a plurality of expandable sections disposed about the shaft; and a cutting portion protruding from exactly two of the plurality of expandable sections located on generally opposite sides of the shaft;

the expandable sections of the sleeve member aligned generally axially with the shaft and having an end portion disposed toward the generally conical portion thereof, the cutting portions protruding generally radially from the end portion of the corresponding expandable sections.

* * * * *